Patented June 12, 1934

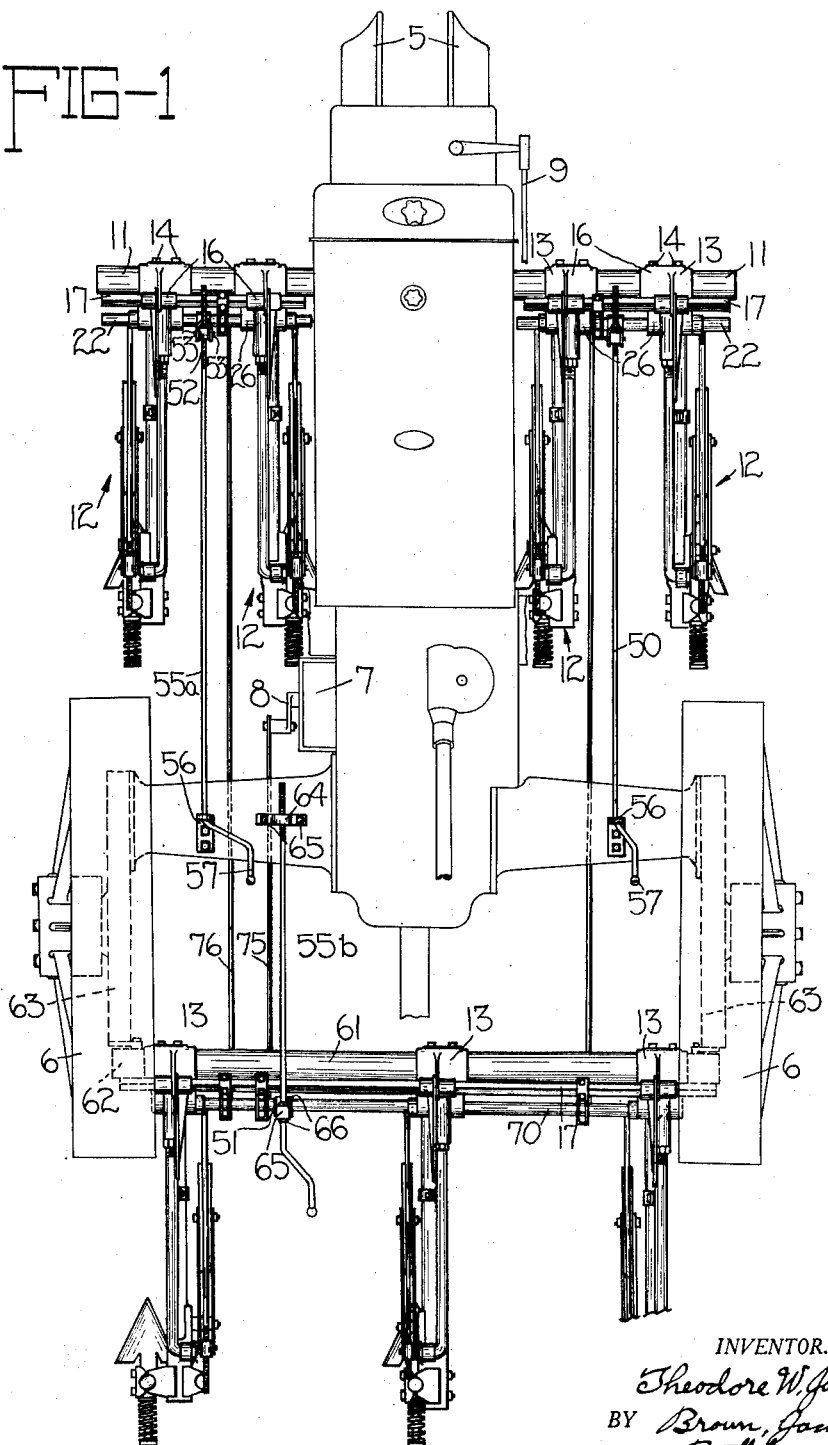

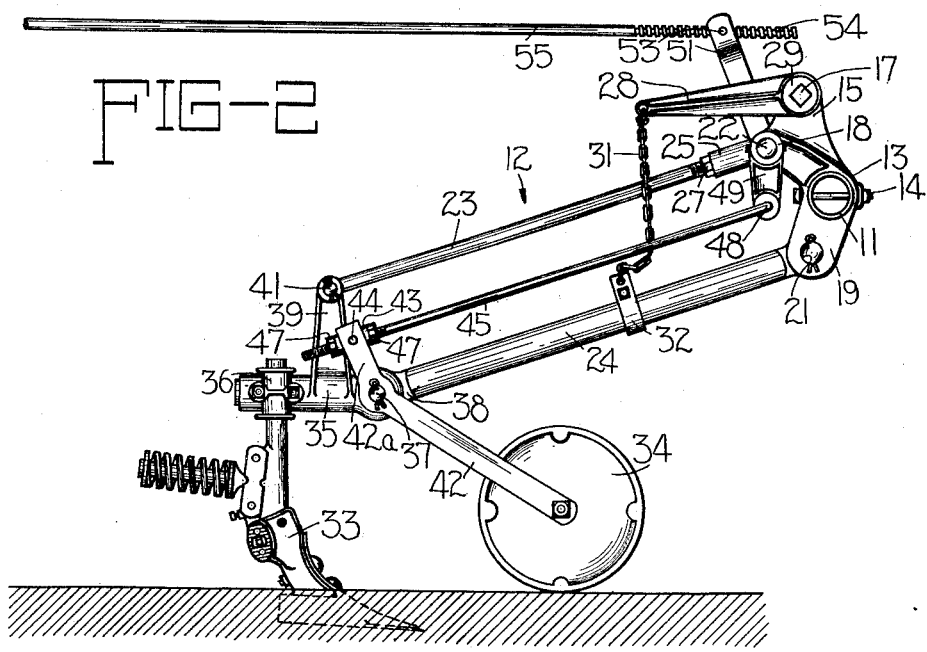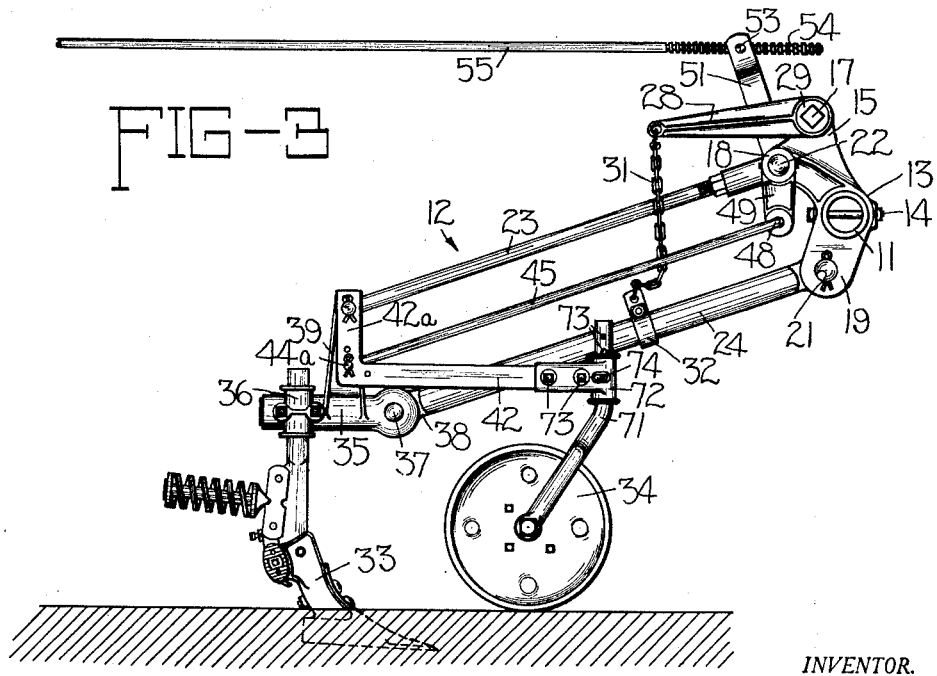

1,962,349

UNITED STATES PATENT OFFICE 1,962,349

CULTIVATOR

Theodore W. Johnson, Moline, Ill., assignor to Deere & Company, Moline, Ill., a corporation of Illinois Application August 3, 1931, Serial No. 554,749

25 Claims. (Cl. 97—47)

This invention relates generally to cultivating implements of the type comprising an attachment or attachments adapted to be directly connected with either the front or rear ends, or both ends, of a tractor, so that the attachment or attachments and the tractor function together as a unitary, power operated cultivating implement, and has more particularly to do with implements of this type in which the cultivating rigs of such attachment or attachments are each provided with a gauge wheel and are separately pivotally connected with the attachment frames so as to be capable of rising and falling independently of each other in passing over uneven ground, the pivotal connecting means being effective to maintain the shovel or shovels of the rigs in a definite angular relation to the ground in the vertical movement of the rigs relatively to the implement frame. As will hereinafter appear, however, certain features of the invention also have application to other types of cultivating implements.

The principal object of the invention is to provide common depth adjusting means for all the gauge wheels of a certain group or set of individually floating rigs whereby the operating depth of the shovels of all of the rigs of the set may be adjusted simultaneously.

Another object of the invention is to provide depth adjusting means for the gauge wheels which is operable from the driver's seat on the implement.

A further object of the invention is to provide such an arrangement of connections between the gauge wheels and the individual rigs that the position of the gauge wheels relative to the shovel or shovels of the rigs is not affected by the rise and fall of the rigs as a whole.

Other objects and advantageous features will be apparent from the following description of my invention taken in connection with the accompanying drawings, in which:

Figure 1 is a top plan view illustrating a tractor implement equipped with my improvements;

Figure 2 is an enlarged side elevation of one of the front cultivator rigs illustrating my improved gauge wheel mounting and the improved means for adjusting the depth of the gauge wheel; and Figure 3 is a modification, being an enlarged side elevation illustrating the means for connecting a castering gauge wheel to the rig and the means for adjusting the depth of said gauge wheel.

The implement illustrated in the drawings is similar in construction to that shown in my pending application, Serial No. 485,844, filed October 2, 1930, and particularly Figures 8 and 9 thereof, with the exception of the gauge wheels and the means for connecting them to the rigs.

The tractor comprises a suitable main frame structure supported at its front end on two steering wheels 5 and at its rear end on two traction wheels 6. In the construction shown the two steering wheels 5 are disposed close together, comparable to a three-wheel tractor, but it is to be understood that the invention is also applicable to a four-wheel tractor wherein the two steering wheels are spaced relatively far apart. The rear traction wheels 6 are driven by power from the tractor motor, which power is transmitted through any conventional arrangement of clutch, selective speed transmission, differential mechanism and driving means to such rear wheels. In order to utilize the power of the engine for lifting the cultivator rigs to transport position, the tractor is provided with a suitable power take-off device operatively connected with the engine and arranged to actuate a power lift clutch under the control of the operator.

Such power lift mechanism is indicated generally by the numeral 7, and as the details thereof constitute no part of the present invention it is not deemed necessary to describe the same specifically herein. It will suffice to say that the power shaft extends laterally from such mechanism and supports a crank 8 adjacent to the side of the tractor frame from which lifting movement is transmitted to the cultivator rigs through linkage which will be presently described.

The front tractor wheels 5 are steered by means of suitable steering mechanism represented in part by a drag link 9 which is operatively connected at its front end with said steering wheels and at its rear end with a steering control wheel (not shown) located adjacent to the operator's seat at the rear end of the tractor.

In the present construction the tractor is equipped with an implement frame extending transversely thereof adjacent its forward end. This transverse implement frame comprises a frame bar 11 suitably supported in an opening in the lower side of the tractor housing in rear of the front steering wheels, said frame bar extending outwardly laterally at each side of the tractor as shown. This construction is similar to that shown in my pending application, Serial No. 485,844, above referred to.

Supported on the front frame bar 11 at each side of the tractor at spaced points on said bar are a pair of cultivator rigs, each of which is indicated as a whole by the numeral 12. By this construction a two row cultivator is provided, but it is to be understood that the frame bar 11 may be extended outwardly farther at each side of the tractor and equipped with additional rigs for the cultivation of additional rows as desired.

Each cultivating rig is operatively connected with the front frame bar 11 by means of a sleeve 13 engaging over the bar and secured thereto by two screws or bolts 14 extending transversely through the sleeve and bar. The bar is provided with a plurality of spaced holes for receiving the bolts 14 at different points therealong so that each sleeve 13 may be shifted in either direction along said bar for accommodating different row spacings between the pairs of rigs.

As shown in Figure 2, an arm 15 projects upwardly and rearwardly from each sleeve 13 and has a suitable bearing boss 16 formed at its outer end. A transversely extending rock shaft 17 is rotatably mounted in the several bearing bosses 16 at each side of the tractor, as shown in Figure 1. Each arm 15 is also provided on the rear side thereof adjacent the bearing boss 16 with a bearing portion 18. Another arm 19 extends downwardly from each sleeve and has a bearing opening 21 formed therein adjacent its lower end. A shaft 22 extends through the several bearing portions 18 at each side of the tractor as best shown in Figure 1. The shaft 22 and the downwardly and rearwardly extending arm 19 pivotally support respectively the upper ends of two substantially parallel links 23 and 24 which support the lower portion of the cultivator rig. The upper link 23 has its upper end screw threaded as shown for threading into a bearing member 25 provided with a sleeve portion 26 loosely engaging over the shaft 22. A nut 27 is provided on the screw threaded upper end of the link 23 for locking the threaded upper end of said link in the desired position in the bearing member 25. By loosening said nut the link 23 may be turned in the bearing 25 to vary its length, thereby providing for leveling the rig as will be readily understood. The lower link 24 has its upper end bent laterally to pass through the opening 21 in the arm 19, the bent end receiving a cotter pin or any other suitable retaining device on the opposite side of the arm for holding the link in position in said arm.

The two rock shafts 17 are square or polygonal in cross section and mounted thereon in the plane of each rig mounting sleeve 13 is a rig lifting arm 28. Each lifting arm is provided with a hub portion 29 having a square or polygonal bore therein engaging over the rock shaft and slidable lengthwise thereof. Suitable means is provided for tightly clamping the hub 29 on the rock shaft whereby movement of the arm 28 longitudinally on said rock shaft is prevented. The clamping means is such however that when the mounting sleeves 13 are shifted along the frame bar 11 to adjust the lateral spacing between the rig units the lifting arm 28 may be moved with said unit by simply loosening such clamping means, said arms then being free to slide along the rock shaft with the sleeve 13. In my pending application above referred to a clamping means of this general type is fully shown and described, but as the present invention is not primarily concerned with the clamping means per se it is not deemed necessary to illustrate and describe the same herein.

The outer end of each lifting arm 28 is operatively connected with the lower link 24 of its associated rig mounting by means of a chain 31, the lower end of said chain being pivotally connected to a bracket 32 suitably secured to said link, as shown in Figures 2 and 3. It will thus be seen that a lost motion connection is provided between the rig and the lifting arm 28, whereby each of the rigs is permitted to rise and fall irrespective of the position of the other rigs of the same set, as will be readily understood.

In the illustrated construction, each cultivating rig 12 comprises one cultivator shovel or other soil working device 33, a gauge wheel 34, and a supporting member 35 on which the shovel or shovels and gauge wheel are both supported, but it is to be understood that more than on shovel 33 may be mounted on the supporting member as desired. This supporting member 35 is in the form of a suitable casting, to the rear end of which, as shown in Figures 2 and 3, is secured by means of a suitable bracket 36 the upper end of the vertically extending shovel standard on the lower end of which the shovel 33 is carried. The casting 35 is provided with a bifurcated bearing portion at its forward end between which the lower end of the link 24 is pivotally mounted by means of a pivot pin or bolt 37, said link being formed with a flattened portion 38 of considerable area, which contacts with the flat surfaces of the bifurcated portion of the casting 35 whereby side play of the lower end of the link is substantially eliminated.

Formed integral with the casting 35 and extending upwardly therefrom, as shown in Figures 2 and 3, is a bracket 39. In the upper end of this bracket is formed a bearing boss 41 through which extends the laterally bent lower end of the upper link 23 of the parallel link mechanism. Said link 23 is held in position in the bearing boss 41 by means of a cotter pin or other suitable locking means inserted through an opening in said link on the opposite side of the bearing boss as shown.

Referring now more particularly to the rig construction shown in Figure 2, the gauge wheel 34 is journaled between two spaced arms 42, and said arms are journaled as shown upon the pivot pin 37 by which the lower link 24 is pivoted between the bifurcated ends of the supporting member 35. Between the upper ends of the spaced arms 42 a sleeve 43 is pivoted on trunnions 44. As shown, the upper portions 42a of the spaced arms 42 above the pivot pin 37 are offset forwardly and extend at an angle to the lower portions of said arms. A rod 45 at its lower end passes through the sleeve 43 and is held in fixed relation thereto by means of two adjusting nuts 47 threaded on the screw threaded rear end of said rod on opposite sides of the sleeve 43.

If desired the rod 45 may be threaded into the sleeve 43, in which case the nuts 47 may be omitted. The upper end of the rod 45 is pivotally connected at 48 to the lower end of an arm 49 fixed at its upper end to the pivot shaft 22, which shaft forms the pivot by which the upper links 23 of the set of rigs on one side of the tractor are journaled to the supporting castings 13 of said rigs.

For simultaneously adjusting the gauge wheels of the set of rigs at one side of the forward end of the tractor, for instance the right hand side as viewed in Figure 1, an arm 51 is fixed to the shaft 22 and extends upwardly therefrom. As shown in Figure 1 the arm 51 is bifurcated at its upper end and between said bifurcated portions a nut 52 is pivotally mounted by means of trunnions 53. The nut 52 receives the screw threaded forward end 54 of a depth adjusting shaft 55 which extends rearwardly to a point adjacent the operator's position on the tractor, the rear end of said shaft being supported in a bracket 56 bolted to the rear axle housing, as shown in Figure 1. The rear end of the shaft 55 is bent to form a crank 57, whereby said shaft may be rotated to move the nut 52 longitudinally along the threaded forward end of the shaft thereby swinging the arm 51 in one direction or the other to turn the pivot shaft 22 in its bearings. This turning of the shaft 22 will rock the arms 49 connected by means of the rods 45 with the gauge wheels of the set of rigs on one side of the tractor, whereby said gauge wheels may be adjusted vertically simultaneously in one direction or the other, as will be readily understood.

Each rig of the set may be individually adjusted as to depth by adjustment of the gauge wheel 34 of each rig by means of the nuts 47, as by moving said nuts in one direction or another along the rod 45, the sleeve 43 may be adjusted along said rod to raise or lower the gauge wheel, as will be readily understood.

The gauge wheels of the several rigs at the left hand side of the forward end of the tractor may be similarly simultaneously adjusted through the manipulation of the adjusting shaft 55a, the mechanism on the left hand side of the tractor being identical with that on the right hand side thereof which has just been described.

In the illustrated construction I have shown the tractor as equipped with a set of rigs at the rear, and such rigs are similar in construction to those already described. The rear rigs are mounted upon a transversely extending draft member or frame bar 61 by sleeve members 13 similarly to the manner in which the front cultivator rigs are mounted on the draft members 11. In the illustrated construction the draft member 61 at the rear of the tractor supports three cultivator rigs, and said member is supported at its outer ends on suitable brackets 62 secured in any desired manner to the chain housings 63, in this respect the construction being the same as that shown in my pending application above referred to. The gauge wheels of the rear set of rigs are adjusted vertically by means of the operating rod 55b the forward end of which is screw threaded and threads into a suitable internally screw threaded bracket 64 secured to the rear axle housing by means of screws or bolts 65, as shown in Figure 1. The rear end of this operating rod 55b extends through a sleeve 65, being held in position in said sleeve by means of collars 66 secured to said operating rod on opposite sides of said sleeve. The sleeve 65 is secured between the bifurcated upper ends of an arm 51 secured to and extending upwardly from a pivot shaft 70 similar to the pivot shafts 22 at the forward end of the tractor and similarly supported as will be readily understood. Except for the operating rod 55b and its connections the mounting of the rigs at the rear of the tractor, including the gauge wheels therefor are similar to those at the forward end thereof.

In Figure 3 of the drawings I have illustrated a modification wherein a castering gauge wheel is associated with each rig and similar parts are indicated by like reference characters. In this construction the gauge wheel 34 is mounted on a spindle 71 supported in a vertical sleeve 72, this construction being similar to that shown in my pending application above referred to. The supporting arm 42 is secured to the sleeve 72 by means of bolts 73, and the arm 42 has an upturned portion 42a extending at right angles to the main portion of the arm. The upper end of the portion 42a is pivotally connected to the standard 39 by the laterally turned end of the upper link 23 which pivotally connects said link with the standard as above described. In this construction the lower end of the rod 45 is pivotally connected to the arm 42 as shown at 44a, the rear end of said rod 45 being bent laterally and passed through an opening in the arm 42, being secured in position with respect to said arm by means of a cotter pin passing through an opening in said laterally turned portion on the opposite side of said arm. The upper end of the rod 45 in this modified construction is pivotally connected at 48 to the lower end of the arm 49 which is secured to and rotatable with the shaft 22 in the same manner as that shown in the construction illustrated in Figure 2. The upturned portion 42a of the arm 42 is the same length as the arm 49, and extends parallel with said arm. That is to say, the distance between the pivots 44a and 48 is the same as the distance between the pivotal centers at the opposite ends of the links 23 and 24. In this modified construction the castering gauge wheel of each rig is adjusted by moving the spindle 71 vertically in the sleeve 72, said spindle being provided with a plurality of holes 73 for receiving a pin 74 inserted through the slot in the sleeve. It is to be understood that the non-castering gauge wheel 34 of Figure 2 may be mounted on an arm similar to the arm 42 shown in Figure 3.

As will be readily understood from the above description in either of the constructions shown in Figures 2 and 3, rotation of the operating rod 55 causes rocking of the shaft 22, whereby the arm 49 is moved fore and aft causing fore and aft movement of the rod 45. This movement of the rod in turn changes the vertical position of the gauge wheel 34 with respect to the shovel 33 carried by the rig, as will be readily understood. Since the rod 45 remains substantially parallel to the links 23 and 24 in all positions of depth adjustment in the structure shown in Figure 2, and absolutely parallel to said links in the construction shown in Figure 3, rise and fall of the rigs as a whole in their travel over undulated ground surface does not affect the vertical position of the gauge wheels relative to the shovels, as is readily apparent.

The two sets of cultivator rigs at the forward end of the tractor and the set of rigs at the rear of the tractor are raised and lowered by the power lift mechanism in the same manner and by the same mechanism as that illustrated and described in my pending application above referred to, and as the present invention is not primarily concerned with these devices per se they will be but briefly described. In this connection it is to be understood, however, that any suitable lift linkage, power operated or otherwise, may be provided for accomplishing raising and lowering of the rigs, and it is to be understood further that the present invention is not only applicable to an attachment or attachments adapted to be mounted on a tractor and in which the rigs are raised and lowered by power lift mechanism, but that it is also applicable to horse drawn cultivators.

The means for raising and lowering the rigs by the power lift mechanism includes a link 75 pivotally connected with the crank 8 at its forward end and at its rear end with the lower end of an arm secured to and extending downwardly from the rear rock shaft 17 whereby the rear rock shaft is rocked to raise and lower the rear rigs. Links 76 pivotally connected at their rear ends with arms secured to and extending from said rear rock shaft 17 extend forwardly on either side of the tractor and have their forward ends pivotally connected respectively with an arm secured to and extending from each of the front rock shafts 17. Thus rocking of the rear rock shaft through movement of the link 75 by the crank 8 will through the links 76 rock the front rock shafts to simultaneously raise and lower the front sets of rigs, as will be readily understood.

I claim:—

1. The combination with a cultivating implement, of a frame bar connected therewith and extending laterally at opposite sides thereof, a set of soil tilling rigs connected with said frame bar on opposite sides of the implement to swing toward and from the ground, a castering gauge wheel associated with each rig and shiftable with respect thereto, means for simultaneously raising and lowering all of the rigs of the implement, and separate means for simultaneously vertically adjusting the gauge wheels of each set of rigs.

2. The combination with a tractor, of a tillage implement connected with said tractor and comprising an implement frame, a plurality of soil tilling rigs, means pivotally connecting each of said rigs with said implement frame independently of the other rigs for vertically movement relative thereto, a castering gauge wheel associated with each of said rigs and shiftable with respect thereto, and means for simultaneously vertically adjusting the gauge wheels of all of said rigs.

3. The combination with a tractor, of a tillage implement connected with said tractor and comprising an implement frame, a plurality of soil tilling rigs, link mechanism movably connecting each of said rigs with said implement frame to permit said rigs to rise and fall relatively to said frame, means for adjusting said link mechanism to level said rigs, a gauge wheel movably connected with each of said rigs to determine the tilling depth thereof, means carried by the frame bar for adjusting the position of said gauge wheels relative to the rigs, and means connecting said gauge wheels with said rigs whereby the position of the gauge wheels relative to the shovels of the rigs is unaffected by the rise and fall of the rigs.

4. In an agricultural implement, the combination with a tractor including a motor, of an attachment comprising a frame connected with the tractor and extending laterally on opposite sides thereof, a plurality of cultivating rigs connected with said frame on each side of the tractor to swing toward and from the ground, power lift mechanism for simultaneously raising and lowering said rigs, a gauge wheel associated with each rig and shiftable with respect thereto, and separate means on each side of the tractor for simultaneously adjusting all of the gauge wheels of the rigs on that side independently of the gauge wheels on the opposite side of the tractor.

5. The combination with a plurality of cultivator rigs, of a castering gauge wheel movably connected with each of said rigs, means for independently adjusting each of said gauge wheels, and means for simultaneously adjusting all of said gauge wheels relative to said rigs.

6. The combination with a cultivating implement, of a frame bar connected therewith and extending laterally at opposite sides thereof, a plurality of soil tilling rigs on each side of the implement and pivotally supported by said frame bar to swing toward and from the ground, a gauge wheel associated with each rig, means connecting the gauge wheels with said rigs whereby the position of the gauge wheels relative to the shovels of the rigs is not affected by the rise and fall of the rigs, means for simultaneously adjusting the gauge wheels of all of the rigs on either side of the implement independently of those at the opposite side, and means for separately adjusting the gauge wheel of each of said rigs.

7. The combination with an agricultural implement, of an attachment comprising a laterally extending draft member, a plurality of cultivating rigs, a plurality of means pivotally connecting said rigs with said draft member for free floating movement relative to each other, a gauge wheel for each of said rigs, and means interconnecting the gauge wheels of all of said rigs, said interconnecting means including certain of the pivotal connecting means between said rigs and said draft member.

8. The combination with an agricultural implement, of a laterally extending draft member, a pivot shaft carried by said draft member, a plurality of cultivating rigs pivotally connected with said pivot shaft for free floating movement relative to each other and to said pivot shaft, a gauge wheel movably associated with each of said rigs, and means including said pivot shaft for vertically adjusting the gauge wheels of all of said rigs.

9. An agricultural implement comprising, in combination, a transverse front frame bar, a plurality of sets of front soil working tools pivotally connected with said front frame bar, gauge wheels for each set movably associated therewith, a rear transverse frame bar, a set of rear soil working tools pivotally connected with the rear frame bar, gauge wheels for said rear set of tools movably associated therewith, means for simultaneously raising and lowering said front and rear sets of tools, and means for independently adjusting the wheels of each set relative to the wheels of the other sets.

10. The combination with an agricultural implement, of a laterally extending draft member, a pivot shaft carried by said draft member, a plurality of cultivating rigs pivotally connected with said pivot shaft for free floating movement relative to each other and to said pivot shaft, a gauge wheel movably associated with each of said rigs, means connecting the gauge wheel on each rig with said pivot shaft whereby all of said gauge wheels may be simultaneously adjusted vertically by rotation of said shaft, and means for rotating said shaft.

11. The combination with an agricultural implement of a laterally extending draft member, a pivot shaft carried by said draft member, a plurality of cultivating rigs pivotally connected with said pivot shaft for free floating movement relative to each other and to said pivot shaft, a gauge wheel movably associated with each of said rigs, means connecting the gauge wheel of each rig with said pivot shaft whereby the gauge wheels of all of said rigs may be simultaneously adjusted by rotation of said shaft, and means for rotating said shaft, the connecting means between each gauge wheel and said shaft being operable to separately vertically adjust its associated gauge wheel irrespective of the means for rotating said shaft.

12. The combination with an agricultural implement, of an attachment comprising a laterally extending draft member, a plurality of cultivating rigs movably connected with said draft member for free floating movement relative to each other, a gauge wheel pivotally connected with each of said rigs, means interconnecting the gauge wheels of all of said rigs including a member connected with each gauge wheel to swing the same about its pivotal connection with the associated rig, and adjustment means cooperating with each of said members for positioning the gauge wheel connected therewith to adjust the operating depth of the associated cultivating rig.

13. An agricultural implement comprising, in combination, a transverse front frame bar, a plurality of sets of front soil working tools pivotally connected with said front frame bar, gauge wheels for each set, a rear transverse frame bar, a set of rear soil working tools pivotally connected with the rear frame bar, gauge wheels for said rear set of tools, means for simultaneously raising and lowering said front and rear set of tools, and means for independently adjusting the tools of each set relative to the tools of the other sets.

14. A cultivating implement comprising, in combination, a transversely extending frame bar, a plurality of soil tilling rigs pivotally connected with said frame bar for vertical movement relative thereto, a gauge wheel movably connected with each of said rigs, and interconnecting means between said frame bar and each of said gauge wheels for maintaining each gauge wheel in a predetermined position relative to the associated rig independent of the vertical movement of the latter.

15. A cultivating implement comprising, in combination, a transversely extending frame bar, a plurality of soil tilling rigs pivotally connected with said frame bar for vertical movement relative thereto, a gauge wheel movably connected with each of said rigs, means interconnecting the frame bar and gauge wheels for maintaining each wheel in a predetermined position relative to the associated rig, and means for shifting at least a part of said interconnecting means to adjust the operating position of the rigs.

16. A cultivating implement comprising, in combination, a transversely extending frame bar, a plurality of soil tilling rigs pivotally connected with said frame bar for vertical movement relative thereto, a gauge wheel pivotally connected with each of said rigs, and means for maintaining each gauge wheel in substantially fixed position relative to the associated rig comprising link means pivotally connected between said gauge wheel and said frame bar, the points of pivotal connection of said link means being spaced apart substantially the same distance as the distance between the pivotal axis of the rigs and the pivotal axis of the associated gauge wheel and in a line extending substantially parallel with respect to the line joining the last mentioned axes.

17. The combination of a tractor, of a tillage implement connected therewith and comprising an implement frame, a plurality of soil tilling rigs, means including a link pivotally connected with said frame and each of said rigs to provide for vertical movement of the rigs relative to said frame, a gauge wheel pivotally connected with each of said rigs, and means including a second link pivotally connected with the frame bar and each gauge wheel, said second link being of substantially equal in length to said first link and extending in substantially parallel relation therewith, whereby the position of the gauge wheels relative to said rigs is unaffected by the vertical movement of the latter.

18. In an agricultural implement, an implement frame, a cultivating rig, means movably connecting the rig with said frame, a gauge wheel for said rig, parallel link mechanism connecting said gauge wheel with said frame and including parts independent of said rig connecting means, and means connecting the gauge wheel to move with said rig.

19. An agricultural implement comprising an implement frame, means connecting said rig with the frame including a link pivotally connected to the frame at one end and to the rig at the other end, a gauging device, a lever supporting the gauging device and pivotally connected with the rig concentrically with the pivotal connection of said link with the rig, a lever pivoted to the frame concentrically with the pivotal connection of said link with said frame, link means connecting said levers, and means mounted on the implement frame for operating the lever pivoted thereto.

20. An agricultural implement comprising a laterally extending draft member, a plurality of cultivating rigs, means pivotally connecting said rigs with said draft member for free floating movement relative to each other, a gauge wheel for each of said rigs, and means interconnecting the gauge wheels of all of said rigs, said interconnecting means including a laterally extending rock shaft connected with each of the gauge wheels and serving as at least a part of the means pivotally connecting the rigs with said draft member.

21. An agricultural implement comprising an implement frame, a cultivator rig, means connecting said rig with the implement frame including a link pivotally connected with the rig and with said frame, a gauge wheel, parallel link mechanism connecting said gauge wheel with the rig and with said frame, said parallel link mechanism including as one element thereof said link, and means for shifting portions of said parallel link mechanism for adjusting the gauge wheel with respect to said rig.

22. An agricultural implement comprising an implement frame, a cultivating rig, means connecting said rig with the frame including a link pivoted at one end to the frame and at the other end to said rig, gauging means, parallel link mechanism connecting said gauging means with the rig and with said frame and including as one element thereof the aforesaid link, means reacting against said frame for raising and lowering said rig in a plurality of substantially parallel positions, and means for shifting at least a portion of said parallel link mechanism for adjusting the operating depth of said rig.

23. An agricultural implement comprising an implement frame, a cultivator rig movably connected therewith, gauging means movably connected with said rig, means including substantially parallel link mechanism connecting the gauging means with said frame, and means for adjusting the position of said gauging means relative to said rig including means adapted to shift at least a portion of said parallel link mechanism.

24. An agricultural implement comprising an implement frame, a cultivator rig movably connected therewith, a gauging means movably connected with said rig, a pair of links connecting said gauging means with said frame, and means for shifting one of said links for varying the position of the gauging means relative to said rig.

25. An agricultural implement comprising a laterally extending draft member, a plurality of cultivating rigs, a gauge wheel for each of said rigs, means interconnecting the gauge wheels of all of said rigs and including a member common to all of the rigs, and means pivotally connecting said rigs with said draft member for free floating movement relative to each other, said pivotal connecting means including said common member.

THEODORE W. JOHNSON.